May 14, 1968     R. HARPER ETAL     3,383,626

BACKWARD WAVE OSCILLATOR INCLUDING MODULATION ELECTRODES

Filed May 21, 1964

INVENTORS
ROBERT HARPER
ROBERT M. UNGER

BY    *Leo R. Reynolds*

AGENT

United States Patent Office 3,383,626
Patented May 14, 1968

3,383,626
BACKWARD WAVE OSCILLATOR INCLUDING
MODULATION ELECTRODES
Robert Harper, Concord, and Robert M. Unger, Wayland,
Mass., assignors to Raytheon Company, Lexington,
Mass., a corporation of Delaware
Filed May 21, 1964, Ser. No. 369,258
4 Claims. (Cl. 332—7)

ABSTRACT OF THE DISCLOSURE

A modulating electrode structure positioned adjacent to a slow wave propagating delay line in a backward wave oscillator device to vary the coupling and interaction between electron beam waves and radio frequency circuit waves on the delay line at the same time that the frequency is varied.

Figure 1:
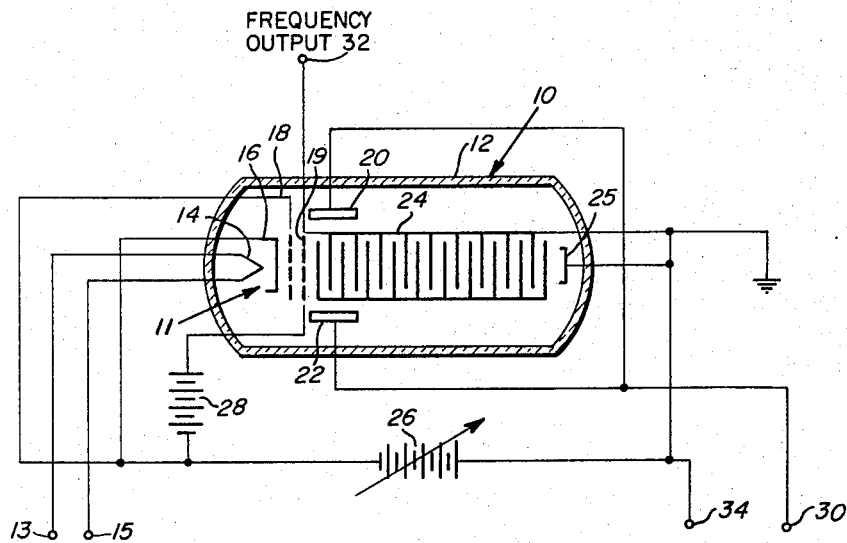

This invention relates to traveling wave tubes and more particularly to a backward wave oscillator employing modulation electrodes.

A backward wave oscillator comprises a traveling wave tube in which a wave propagating structure, such as a helix or other type slow wave structure, is disposed adjacent an electron beam originating from a source of electrons such as a cathode and traveling near the structure with a velocity very near the velocity of propagation of a wave induced on the wave structure. With suitable impedance terminations at each end of the wave propagating structure a condition of oscillation will be reached if sufficient electron beam current is supplied. The oscillation results from a process of continuous feedback along the wave propagating structure and is not dependent on reflections from the ends of the wave propagating structure. Consequently, the backward wave oscillator is capable of oscillating at any beam voltage, that is the potential difference between the cathode and collector electrodes, given sufficient beam current and appropriate selection of the mode of oscillation.

In some applications of the backward wave oscillator of the type described it is desirable to be able to amplitude modulate the oscillating signal on the wave propagating structure at the same time that the frequency is being varied. Amplitude modulation is normally accomplished by introducing an electrode such as the well known grid between the cathode and the wave propagating structure. By varying the voltage between the grid and the cathode beam current is varied and hence the degree of interaction between the electron beam and the signal introduced on the wave propagating structure is varied resulting in amplitude modulation of the signal on the wave propagating structure. The voltage at the grid electrode and the voltage at the cathode is a high negative voltage with respect to ground. Therefore, connection of a modulation signal to the grid electrode necessitates some sort of isolation circuit such as a transformer. Alternatively, in the past in order to amplitude modulate a backward wave oscillator at the same time that it is being tuned in frequency it has been necessary to ground the cathode and insulate the wave propagating structure from ground. Insulating the wave propagating structure from ground results in a further complication in that a DC isolator is thereby required between the wave propagating structure and the RF output means coupled to the wave propagating structure.

Accordingly, it is an object of the present invention to provide an amplitude modulation electrode which will produce the desired modulation while being operated at a potential close to the potential on the delay line. In this manner the signal induced in the wave propagating structure may be varied in frequency while at the same time it may be amplitude modulated without the necessity for introducing DC isolation between the delay line and the RF output terminal. Furthermore, an isolation circuit is not required between the modulation signal and the modulating electrode.

These and other objects of the invention are provided by a traveling wave device comprised of a wave propagating structure adapted to support an electromagnetic signal; a source of electrons such as an electron gun for transmitting a beam of electrons in proximity to said wave propagating structure; and a pair of modulating electrodes adjacent said electron beam for deflecting the beam so that coupling between the beam and the structure is varied resulting in varied interaction efficiency and thereby amplitude modulation of the electromagnetic output power from the wave propagating structure.

Figure 2:
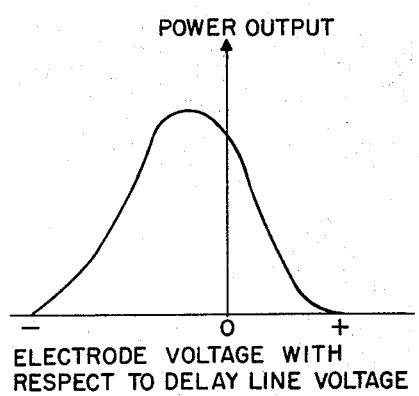

Other objects, features and advantages of the present invention will be fully understood by the following description, taken together with the accompanying drawings in which:

FIG. 1 is a schematic view of a traveling wave tube circuit embodying the modulating electrode apparatus of the invention; and FIG. 2 is a graph depicting the power output from the apparatus of FIG. 1 vs. the modulating electrode voltage with respect to the delay line voltage.

Referring specifically to FIG. 1, there is shown a traveling wave tube 10 of the invention comprising an electron gun assembly designated generally at 11, a pair of modulating electrodes 20 and 22, a slow wave structure such as an interdigital delay line 24, and a collector electrode 25. The aforerecited elements are enclosed in an evacuated envelope 12 comprised of suitable material, such as glass. A magnet, not shown, provides a focusing magnetic field for an electron beam projected from cathode 16 toward collector electrode 25. Alternatively, the electron beam may be focused electrostatically in the well known manner.

The electron gun consists of a heater 14 supplied with heater current from a source not shown connected to terminals 13 and 15, a cathode 16 and a grid 18 maintained at a negative potential with respect to ground by voltage source 26 and an accelerating anode 19 maintained at a positive potential with respect to the cathode by means of voltage source 28.

Collector electrode 25 and delay line 24 are coupled to the positive side of voltage source 26 which is at ground potential. Modulating electrodes 20 and 22 are coupled together and connected to modulating input terminal 30.

By varying the potential from voltage source 26 the traveling wave tube 10, as is well known, can be made to oscillate at any frequency within a predetermined broad range of frequencies established primarily by the dimensions of the delay line. The oscillating output signal, caused by interaction of electron beam waves with circuit waves on the delay line as the beam passes near the delay line, is extracted from the delay line at terminal 34 and may be coupled to a suitable load or utilization device, not shown.

In accordance with the invention it has been found that amplitude modulation of the frequency signal induced on the delay line may be accomplished by impressing a relatively small voltage signal on modulating electrodes 20 and 22. This result can be seen in the graph of FIG. 2, which is a plot of power output from the tube of FIG. 1 at a substantially fixed frequency versus the voltage difference across terminals 34 and 30. As can be seen in FIG. 2, a peak power output is achieved when the voltage on electrodes 20 and 22 is slightly below ground or zero volts. As the potential is made progressively negative the power drops off and approaches zero output. A similar result occurs as the potential across terminals 34 and 30 is made progressively more positive.

It is believed that the reason for this phenomena is that as the electrodes 20 and 22 are made progressively more positive than the delay line 24 the transverse electrostatic field from the electrodes tends to deflect the electron beam away from the delay line so that the coupling efficiency between the beam and the delay line is reduced. As the modulating electrodes are made more negative with respect to the delay line the transverse electric fields tend to deflect the beam toward the delay line. Initially the coupling efficiency is increased, resulting in higher output power. As the negative potential is further increased, the electron beam starts to become intercepted by portions of the delay line near the collector electrode thereby reducing the length of interaction between beam and delay line and hence the R.F. output power is reduced. For ordinary amplitude modulation a fixed bias voltage is applied across terminals 34 and 30 which bias is set such that application of additional increments of voltage results in changes from full power output to zero power output.

It should be noted that in the apparatus of the invention thus disclosed the delay line is operated at ground potential, affording advantages in ruggedness, ease in cooling and output coupling. Furthermore, frequency tuning can be accomplished independent of amplitude modulation.

It should be understood that the foregoing description of an embodiment of the invention is exemplary and that many variations thereof will occur to those skilled in the art without departing from the spirit and scope of this invention. For example, other delay lines such as ladder lines, ring-bar and contrawound helices may be substituted for the interdigital delay line of FIG. 1. The interdigital delay line may contain a single aperture for passage of the beam in proximity thereto. Alternatively, a plurality of apertures may be provided for passage of a plurality of beams as would be the case in the well known split beam tubes.

Accordingly, it is to be understood that the invention should not be limited by the particular details described herein except as defined by the appended claims.

What is claimed is:
1. A traveling wave tube comprising:
   a periodic slow wave structure and means biasing said structure at substantially ground potential to induce electromagnetic circuit waves thereon;
   means for forming and projecting an electron beam in proximity to said structure;
   and at least one modulating electrode disposed adjacent to one end of said slow wave structure and biased by a relatively small voltage signal at a potential substantially similar to the potential on said slow wave structure for modulating the output electromagnetic frequency oscillations derived from interaction between the electron beam and circuit waves.

2. In combination:
   a periodic slow wave structure and means biasing said structure at substantially ground potential to induce electromagnetic circuit waves thereon;
   means for forming and projecting an electron beam in proximity to said structure;
   and at least one modulating electrode disposed adjacent to one end of said slow wave structure and biased by a relatively small voltage signal at a potential substantially similar to the potential on said slow wave structure to deflect said beam and vary the coupling efficiency between the beam and said circuit waves.

3. In combination:
   a periodic slow wave structure and means biasing said structure at substantially ground potential to induce electromagnetic circuit waves thereon;
   means for forming and projecting an electron beam in proximity to said structure;
   a pair of oppositely disposed modulating electrodes in proximity to one end of said structure and means providing a transverse electrostatic field between said electrodes at a potential substantially similar to the potential on said slow wave structure for modulating the output electromagnetic frequency oscillations derived from interaction between the electron beam and said circuit waves.

4. In combination:
   a periodic slow wave structure and means biasing said structure at substantially ground potential to induce electromagnetic circuit waves thereon;
   means for forming and projecting an electron beam in proximity to said structure;
   and at least a pair of electrode means disposed adjacent to one end of said structure and means providing a transverse electrostatic field between said electrode means at a potential substantially similar to the potential on said slow wave structure to deflect said beam and vary the coupling efficiency between the beam and the structure to modulate oscillatory output signals derived from interaction between the beam and said induced circuit waves on the structure.

References Cited

UNITED STATES PATENTS

| 2,456,466 | 12/1948 | Sunstein | 332—25 |
| 2,565,357 | 8/1951 | Donal | 332—58 X |
| 2,721,953 | 10/1955 | Rothstein | 332—58 X |
| 2,944,224 | 7/1960 | Lacy | 332—7 X |

ALFRED L. BRODY, *Primary Examiner.*